(12) United States Patent
Davidov et al.

(10) Patent No.: US 10,947,459 B2
(45) Date of Patent: Mar. 16, 2021

(54) ONE-STEP LOW-TEMPERATURE PROCESS FOR CRUDE OIL REFINING

(71) Applicants: Boris Davidov, Rehovot (IL); Yurii Guk, Lviv (UA)

(72) Inventors: Boris Davidov, Rehovot (IL); Yurii Guk, Lviv (UA)

(*) Notice: Subject to any disclaimer, the term of this patent is extended or adjusted under 35 U.S.C. 154(b) by 0 days.

(21) Appl. No.: 16/341,279

(22) PCT Filed: Apr. 4, 2017

(86) PCT No.: PCT/IL2017/050407
§ 371 (c)(1),
(2) Date: Apr. 11, 2019

(87) PCT Pub. No.: WO2018/087744
PCT Pub. Date: May 17, 2018

(65) Prior Publication Data
US 2019/0241818 A1 Aug. 8, 2019

(30) Foreign Application Priority Data

Nov. 8, 2016 (IL) .......................................... 248844

(51) Int. Cl.
| | | |
|---|---|---|
| *C10G 3/00* | (2006.01) | |
| *C10G 29/22* | (2006.01) | |
| *C10G 17/095* | (2006.01) | |
| *C10G 17/00* | (2006.01) | |
| *C10G 9/00* | (2006.01) | |
| *C10G 61/02* | (2006.01) | |

(52) U.S. Cl.
CPC .............. *C10G 29/22* (2013.01); *C10G 3/40* (2013.01); *C10G 9/00* (2013.01); *C10G 17/00* (2013.01); *C10G 17/095* (2013.01); *C10G 61/02* (2013.01); *C10G 2300/1003* (2013.01); *C10G 2300/1007* (2013.01); *C10G 2300/1044* (2013.01); *C10G 2300/1051* (2013.01); *C10G 2300/1055* (2013.01); *C10G 2300/1081* (2013.01); *C10G 2300/305* (2013.01); *C10G 2300/4006* (2013.01); *C10G 2400/02* (2013.01); *C10G 2400/04* (2013.01); *Y02P 30/20* (2015.11)

(58) Field of Classification Search
CPC ... C10G 3/40; C10G 3/42; C10G 3/44; C10G 3/00; C10G 9/00; C10G 230/1011; C10G 230/1014; C10G 230/1018
See application file for complete search history.

(56) References Cited

U.S. PATENT DOCUMENTS

| | | | | |
|---|---|---|---|---|
| 4,512,878 A | * | 4/1985 | Reid | C10M 175/02 208/179 |
| 5,152,886 A | * | 10/1992 | Paris-Marcano | C10G 1/04 208/265 |
| 2013/0079565 A1 | * | 3/2013 | Miller | C10G 3/40 585/240 |
| 2015/0152339 A1 | * | 6/2015 | Willner | C10G 3/40 585/16 |
| 2015/0291889 A1 | | 10/2015 | Pratt et al. | |
| 2016/0177188 A1 | | 6/2016 | Vilonen et al. | |

FOREIGN PATENT DOCUMENTS

GB 629711 A1 9/1949

OTHER PUBLICATIONS

International Search Report PCT/IL2017/050407 Completed Jul. 5, 2017; dated Jul. 14, 2017 3 pages.
International Search Report PCT/IL2017/050407 dated Jul. 14, 2017 5 pages.

* cited by examiner

*Primary Examiner* — Michelle Stein
(74) *Attorney, Agent, or Firm* — The Roy Gross Law Firm, LLC; Roy Gross

(57) ABSTRACT

The present application provides a one-step refining process of a hydrocarbon feedstock, said process comprising heating said hydrocarbon feedstock with one or more fatty acids or mixtures thereof, at a temperature below 350° C., to obtain a light hydrocarbon product, wherein said light hydrocarbon product obtained in said process contains no heavy hydrocarbons products.

17 Claims, No Drawings

A standard industrial refinery process for converting crude
ONE-STEP LOW-TEMPERATURE PROCESS FOR CRUDE OIL REFINING

RELATED APPLICATIONS

This application is a National Phase of PCT Patent Application No. PCT/IL2017/050407 having International filing date of Apr. 4, 2017, which claims the benefit of priority of Israeli Patent Application No. 248844 filed on Nov. 8, 2016. The contents of the above applications are all incorporated by reference as if fully set forth herein in their entirety.

TECHNICAL FIELD

In general, the present application relates to the field of crude oil refining and treatment of crude oil residues, waste lubricating oils and other oil wastes and oil sludge. In particular, the present application relates to one-step combination process comprising refining, isomerisation and cracking of crude oil, refinery feedstocks, waste lubricating oils, oil sands, oil sludge and other oil wastes in the presence of fatty acids to obtain light hydrocarbon fractions, such as diesel, gasoline, kerosene and naphtha in a very high yield.

BACKGROUND

A standard industrial refinery process for converting crude oil into more valuable hydrocarbons comprises fractionating or distilling the crude oil to recover separate streams of light petroleum gases, naphtha, gasoline (or petrol) for motor and turbine fuels, kerosene, diesel fuel (or fuel oil), lubricating oil, heavy gas oil, and residual heavy low-quality fuel oil called "mazut" for generating plants and similar applications. Crude oil is traditionally treated in the oil refinery by a set of fractionating columns and chemical conversion operations to produce final commercial products satisfying well-defined standards or specifications, for example, distillation ranges, sulphur contents, characteristic technical indices such as the octane number or diesel number, etc.

As mentioned above, the final commercial products include light petroleum gases, petrochemical naphtha, gasoline (petrol), kerosene, diesel fuel (fuel oil) and other categories of fuel with greater or lesser octane number, lubricating oils, and other products, such as solvents, paraffin, turbine fuel and even road asphalt. An oil refinery thus produces a relatively large number of final commercial products from a certain number of crude oils, selected as a function of their composition and price.

Many steps may be involved in the refining of crude oil to produce desired products. The major processes, which are involved in refining crude oil, are fractional distillation, isomerisation, catalytic or thermal cracking and synthesis of aromatic compounds. Typically, a crude oil feed is initially preheated and then streamed to a crude tower, which is heated normally by steam. Volatile and light fractions of the crude oil, such as liquid petroleum gas and naphtha, are removed from the upper portions of the crude tower and heavier components are removed from the lower portions of the crude tower. The heavy fraction, which typically contains lubricating oils and heavy gas oil, is subjected to catalytic cracking in a gas oil cracker. The heavy gas oil is cracked to produce lighter, more valuable components in this catalytic cracking unit.

Thus, the conventional crude oil refining process normally comprises two major processes. The first process is a fractional distillation that involves pumping crude oil through pipes in hot furnaces and separating light hydrocarbon molecules from heavy molecules in tall downstream distillation towers, which give refineries their distinctive skylines. They may operate at atmospheric pressure and in vacuum. During the fractional distillation process, crude oil fractions (from liquid petroleum gas to heavy gas oil) are separated according to their molecular weight. This process is also known as topping because the vapours rise inside the distillation column while the heavy fractions or residues, remain at the bottom, without vaporising. As the vapours rise, the molecules condense into liquids at different temperatures in the column. Only gases reach the top, where the temperature normally drops below 160° C. Because of condensation, which is equilibrated with vaporisation on the fractional distillation plates inside the column, the liquids are formed on these plates (or trays) located at different heights of the column. These liquid oils become increasingly light the higher they are found in the column. Each plate collects a different fraction, also known as a "petroleum cut", with highly viscous hydrocarbons like bitumen (asphalt) at the bottom and gases at the top.

The heavy residues left after the fractional distillation still contain many products of medium density. The residuals are transferred to another column, likely vacuum column, where they undergo a second distillation to recover middle distillates like heavy gas oil, lubricating oil and jet oil. There are still many heavy crude oil residues remaining after the atmospheric and/or vacuum fractional distillation that constitutes a refinery feedstock. The "refinery feedstock" is a rarely single product, but mostly a combination of fractions derived from crude oil and destined for further processing other than blending in the refining industry. It is transformed into one or more components or finished products.

The refinery feedstock should be further converted to lighter products, decomposed or removed in order to meet the requirements for disposal of the residues in the crude oil refineries. The refinery feedstock is converted to lighter products in a process called "cracking", which can be either thermal or catalytic, when the heavy hydrocarbons are decomposed into lighter hydrocarbons. The modern high-pressure thermal cracking of the crude oil fractions normally operates at absolute temperatures of 500-540° C. and pressures of about 2-5 MPa. An overall process of chemical disproportionation can be observed, where light hydrogen-rich products are formed at the expense of heavier molecules, which condense and become depleted of hydrogen. The actual reaction is a homolytic fission producing alkenes, which are used in the economically important production of polymers. In addition, thermal cracking is currently used to "upgrade" very heavy fractions or to produce light fractions or distillates, burner fuel and/or petroleum coke.

The catalytic cracking of crude oil fractions is typically conducted in the presence of acid catalysts (usually solid acids, such as silica-alumina and zeolites), which promote a heterolytic breakage of bonds and speed up the chemical reaction. This process normally converts not more than 60% of the refinery feedstock into gas, gasoline and diesel. The yield can be increased a bit further by adding hydrogen, a process called hydrocracking, or by using deep conversion to remove carbon.

There are several problems associated with the above processes. The first problem is more general and originates from the fact that the traditional refinery process is based on fractionation. Atmospheric distillation uses heat to separate crude oil into naphtha, kerosene, gasoline, diesel and heavy gas oil. The light fractions are obtained in a relatively low total yield (less than 60% in average) and heavy gas oil and residues require further processing, which is the second major problem.

Use of expensive catalysts and vacuum distillation columns to process the heavy gas oil fractions and residues under vacuum conditions only partially solve the above problems. However, not many crude oil refineries even invest in installation of the expensive vacuum distillation columns. Most of them just prefer to sell the heavy gas oil fractions and residues including mazut to generating plants, building and maritime industries. This brings us face to face with another serious problem, which has not been solved yet. The problem is a lack of complete and cost-effective disposal of the crude oil components, which are heavier than diesel and lubricating oils and which are considered very low value products. These components, such as mazut, bitumen and tar, make the crude oil processing very difficult. However, the real problem is the insufficient cracking and utilisation of the refinery feedstock left after the cracking process. The gasoline produced in the catalytic cracking unit has an elevated octane rating because it contains a relatively large portion of the isomerized hydrocarbons, such as iso-heptanes and isomers of the kerosene fraction. It is therefore less chemically stable compared to other gasoline components due to its olefinic profile.

In general, current processing of the heavy gas oil and residues in the crude oil refineries creates serious maintenance and environmental problems. Solid and liquid wastes produced by the refineries have been stored and accumulated for many decades in the specially constructed reservoir beds beneath the earth. It is not a secret however that their storage capacity is finite, which presents environmental hazard. Because storage capacity is finite, the refineries have to invest a lot in the proper management and removal of the residue components in order to maintain an ecologically clean and hazard-free environment and to keep the refineries running. Moreover, tanks, which have contained crude oil residues, asphalt or high-melting-point products need to be steamed or chemically cleaned periodically and prior to ventilation and entry because of the pyrophoric and cancerogenic hazards. Bitumen, for example, cannot be easily removed because it does not flow at ambient reservoir temperatures and has a density or API gravity of less than 10 gravity units. Resolving all these problems involve additional costs and present a challenge during the continuous operation of the refineries.

The last but not the least problem is an extremely low efficiency of the overall refinery process. As mentioned above, the most useful and desirable light oil fractions are obtained in a relatively low yield. In reality, not more than 50% of the crude oil feedstock results in the light fractions. Eventually, more complicated is the operation, more it costs and more energy it uses. As noted above, the cracking process requires very high temperatures and cumbersome procedures to achieve a relatively low yield of the light oil products. In addition, as explained above, the solid heavy residues left after the cracking process may pose a serious problem in the operation of refineries and in the ecological situation in the surrounding areas. Therefore, the current refining industry's ongoing objective is to find a balance between the yield, the cost of conversion and ecological factors.

It is thus an object of the present application to increase significantly an economic and ecological value of the products obtained during the refining process of the crude oil, refinery feedstocks, oil sludge and wastes. This is done by essentially improving the processability of the heavy gas oil fractions and residues in a one-step low-temperature process involving distillation and cracking of a hydrocarbon feedstock upon heating in the presence of fatty acids, and by complete removal of the residual low-quality products, such as mazut, from the energy industry.

SUMMARY

The details of one or more embodiments are set forth in the description below. Other features, objects and advantages of the described techniques will be apparent from the description and from the claims.

The present application describes embodiments of a one-step combination process comprising refining, catalytic cracking and isomerisation of a fractionated or non-fractionated hydrocarbon feedstock, said combination process comprising heating said hydrocarbon feedstock with one or more fatty acids or mixtures thereof, at a vapour temperature below 360° C., to obtain a light hydrocarbon product, wherein said light hydrocarbon product obtained in said process contains no heavy hydrocarbon products, and wherein said process is accompanied by formation of aromatic hydrocarbons.

The hydrocarbon feedstock of an embodiment is selected from crude oil (petroleum), atmospheric or vacuum residues of refinery feedstocks, solvent deasphalted oils derived from said crude oil and said atmospheric or vacuum residues of refinery feedstocks, shale oil, oil sands, waste lubricating oils, oil sludge and other oil wastes, or mixtures thereof. The light hydrocarbon products are light petroleum gases, naphtha, gasoline (petrol) for motor and turbine fuels, kerosene, diesel fuel (fuel oil) and light crude oil. The heavy hydrocarbon products, which are not obtained in said process, are the hydrocarbons with 25 carbon atoms or more.

In a certain embodiment, the hydrocarbon feedstock is continuously fed into the reaction vessel together with said one or more fatty acids, or mixtures thereof. In a specific embodiment, one or more fatty acids are selected from stearic acid, oleic acid, myristic acid, palmitic acid, palmitoleic acid, linoleic acid, linolenic acid, arachidic acid, gadoleic acid, erucic acid or mixtures thereof. The obtained light hydrocarbon products are continuously distilled from the reaction vessel, with or without fractionation, and further collected in a product storage tank.

The hydrocarbon feedstock of an embodiment is pre-treated prior to feeding it into the reaction vessel to remove water, water-soluble salts and suspended solids from said hydrocarbon feedstock. Said hydrocarbon feedstock is initially diluted, separated from suspended solids on standing, streamed into an oil-water separator for separating gross amounts of oils from a wastewater and suspended solids found in the wastewater effluents of refineries and various plants or in the waste lubricating oils, oil sludge and other wastes. In a particular embodiment, said hydrocarbon feedstock is diluted with a portion of the light hydrocarbon product for obtaining the hydrocarbon feedstock having the density lower than 0.82-0.84 g/cm$^3$. If the light hydrocarbon product used for dilution of the raw hydrocarbon feedstock is taken from the light naphtha fraction, which is the fraction boiling between 40° C. to 105° C. and consisting mainly of pentane, hexane and heptane, the entire dilution process is not recycling. Otherwise, the portion of the light hydrocarbon product used for dilution is constantly recycled from the product storage tank to said oil-water separator. The process of an embodiment can be continuous or semi-continuous, and it can be carried out under atmospheric pressure, under elevated pressure or in vacuum.

DETAILED DESCRIPTION

The details of one or more embodiments are set forth in the description below. Other features, objects and advantages of the described techniques will be apparent from the description and from the claims.

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

The term "comprising", used in the claims, should not be interpreted as being restricted to the components and steps listed thereafter; it does not exclude other components or steps. It needs to be interpreted as specifying the presence of the stated features, integers, steps or components as referred to, but does not preclude the presence or addition of one or more other features, integers, steps or components, or groups thereof. Thus, the scope of the expression "a process comprising x and z" should not be limited to processes including only steps x and z.

The present application describes embodiments of a one-step combination process comprising refining, catalytic cracking and isomerisation of a fractionated or non-fractionated hydrocarbon feedstock, said combination process comprising heating said hydrocarbon feedstock with one or more fatty acids or mixtures thereof, at a vapour temperature below 360° C., to obtain a light hydrocarbon product, wherein said light hydrocarbon product obtained in said process contains no heavy hydrocarbon products, and wherein said process is accompanied by formation of aromatic hydrocarbons. As mentioned above, the "refining" comprises the fractional distillation. The above term "light hydrocarbon product contains no heavy hydrocarbon products" means that although the heavy hydrocarbon products are initially present in the hydrocarbon feedstock and possibly not completely reacted and converted into the light hydrocarbon product, the final light hydrocarbon product distilled from the reaction vessel does not contain any of them. Nonetheless, small amounts of the liquid hydrocarbon products may remain at the bottom of the reaction vessel. These small amounts (not more than 10% of the hydrocarbon feedstock) can be separated from solid residues, brought back to the same or other reaction vessel and then converted to the light hydrocarbon products by the same process, while heating the liquid residue at the bottom of the reaction vessel. Such recycling allows significantly increasing the reaction yield of the process, which is strongly dependent on the initial content of asphaltenes in the reaction mixture.

In one embodiment, the hydrocarbon feedstock comprises crude oil, refinery feedstocks, waste lubricating oils, oil sludge and other oil wastes or mixtures thereof. The "hydrocarbon feedstock" is defined herein as any hydrocarbon feedstock, not separated in fractions, and used in refinery operations, comprising natural gas condensate, crude oil (petroleum), atmospheric or vacuum residues or refinery feedstocks, solvent deasphalted oils, which are derived from these crude petroleum oil and residues, shale oil, oil sands, waste lubricating oils, oil sludge and any other oil wastes. The hydrocarbon feedstock may also be pre-treated with one or more processing chemicals including solvents, demulsifiers, corrosion inhibitors, and the like.

The "light hydrocarbon product" of an embodiment is defined herein as light petroleum gases, naphtha, gasoline for motor and turbine fuels, kerosene, diesel and light crude oil, or mixtures thereof. These are the only light hydrocarbons formed in the process of an embodiment. The heavy hydrocarbon products having 25 carbon atoms or more are either not formed in the process of an embodiment or formed in very small amounts that can be neglected. It has been surprisingly found that heating of the hydrocarbon feedstock with the fatty acids results in:
1) Isomerisation of all hydrocarbon molecules starting from hexane up to heavy hydrocarbon molecules, and
2) Efficient cracking of heavy hydrocarbon molecules to form light hydrocarbon molecules.

This process was found to be accompanied by formation of aromatic hydrocarbons.

As the cracking reaction proceeds, the formed light hydrocarbon product is continuously distilled from the reaction vessel, with or without fractionation, and further collected in the product storage tank. The "low-temperature cracking" is defined herein as a continuous or semi-continuous cracking process, which is carried out at a vapour temperature below 360° C., under atmospheric pressure, elevated pressure or even in vacuum, converting the high-boiling, high-molecular weight hydrocarbon fractions of the hydrocarbon feedstock into much lighter diesel oil, kerosene, gasoline, naphtha and petrol products. The most important features of the process of the present application are that no heavy hydrocarbon products are formed and aromatic hydrocarbons are spontaneously formed during the process.

The process of an embodiment is a true one-step continuous process carried out in a single reaction step. The hydrocarbon feedstock is continuously fed into the reaction vessel together with one or more fatty acids, or mixtures thereof. In a particular embodiment, the fatty acid is selected from stearic acid, oleic acid, myristic acid, palmitic acid, palmitoleic acid, linoleic acid, linolenic acid, arachidic acid, gadoleic acid, erucic acid or mixtures thereof. Use of the fatty acids allows efficiently cracking the hydrocarbon feedstock at a vapour temperature below 360° C. in a non-separated hydrocarbon feedstock. Therefore, the reaction vessel does not need to be heated above 400° C., which makes the whole process economically much more viable than the existing crude oil refining processes, not to mention again that the process is carried out in one-step, and only light hydrocarbon products are obtained.

Mechanism behind the isomerisation and cracking reaction of the supplied hydrocarbon feedstock in the presence of fatty acids remains unknown. However, we can speculate that the fatty acids are capable of complexing metals, which they extract from the raw hydrocarbon feedstock. Crude oil generally contains metals such as vanadium, nickel and iron. Such metals normally tend to concentrate in the heavier fractions such as mazut, bitumen and tar. The presence of the metals however makes the processing of these heavier fractions extremely difficult. Being highly hydrophobic, the fatty acids are capable of rapidly penetrating in the oily bulk of the hydrocarbon feedstock fed to the reaction vessel, thereby forming complexes with the metals within said bulk. Once the fatty acids form the complexes with the metals, they become supposedly capable of making the cracking reaction much easier to proceed (by lowering the temperature of the reaction), without any chemical catalyst or additive. Therefore, the fatty acids or mixtures thereof can be defined herein as a "reactant-catalyst". Indeed, this is a surprising finding that the fatty acids or mixtures thereof are capable of reacting and catalysing the process of the embodiments.

In a certain embodiment, the hydrocarbon feedstock should be pre-treated prior to feeding it into the reaction vessel. This is done in order to remove water, water-soluble salts and suspended solids from the hydrocarbon feedstock prior to refining. Quality requirements to pre-treating of the raw hydrocarbon feedstock is the same as in any industrial refinery, i.e. water content should not exceed 0.5% and the feedstock streamed in the reaction vessel must be free of any suspended solids and water-soluble salts.

In some embodiments, the raw hydrocarbon feedstock received at the refinery may be initially diluted (prior to its pre-treatment) in order to obtain the hydrocarbon feedstock solution having the density lower than 0.82-0.84 g/cm$^3$. This raw hydrocarbon feedstock is diluted with a portion of the light hydrocarbon product obtained in the process of an embodiment.

In a specific embodiment, the light hydrocarbon products used for dilution of the raw hydrocarbon feedstock are taken from the light naphtha fraction, which is the fraction boiling between 40° C. to 105° C. and consisting mainly of pentane, hexane and heptane molecules. The light naphtha fraction can be used for dilution of waste lubricating oils, oil sludge and any other oil wastes in the process of the embodiments in order to increase the yield of gasoline. Dilution can be carried out at all stages of processing the hydrocarbon feedstock and its transportation, may facilitate the separation of the crude oil from the suspended solids and water, and may reduce energy costs for heating during transportation. This is in contrast to the present situation in the crude oil industry, when only heavy fractions are diluted with light fractions, and the heavy fractions should be heated during transportation to prevent their solidification.

If the light hydrocarbon product used for dilution of the raw hydrocarbon feedstock is taken from the aforementioned light naphtha fraction, the entire dilution process is not recycled. Otherwise, the portion of the light hydrocarbon product used for dilution is constantly recycled from the product storage tank to said oil-water separator. In a particular embodiment, part of the obtained light hydrocarbon product, which does not constitute a light naphtha fraction (pentanes, hexanes or heptanes), is streamed back into the oil-water separator to dilute the raw hydrocarbon feedstock prior to feeding it into the reaction vessel. There is a constant amount of the light hydrocarbon product separated after distillation from the total amount of the distilled light hydrocarbon product. It is then piped back into the oil-water separator for dilution of a new portion of the hydrocarbon feedstock. This constant amount of the distilled light hydrocarbon product is actually circulating between the product storage tank and the oil-water separator.

The process of an embodiment for obtaining the light hydrocarbon product should be carried out at the reaction conditions close to adiabatic. This is done to ensure that the reaction mixture is heated with the heat released from the exothermic reaction taken place in the reaction vessel. For this reason, the rate of the reaction should be equal or higher than the rate of vaporisation of the formed light hydrocarbons and their isomers. Since this is a one-step process, the light hydrocarbon product is formed in the reaction vessel and immediately distilled from the reaction vessel while the reaction continues to proceed. As noted above, the formation of the aromatic hydrocarbons during the reaction accompanies the process of the present invention.

As any other industrial refining process, the process of an embodiment can be either atmospheric, carried out in vacuum or under elevated pressure, with or without fractionation. The light hydrocarbon product obtained in a high yield (more than 75%) can be further streamed into a fractional distillation column to separate it into consumer products, such as light petroleum gases, naphtha, gasoline, kerosene and diesel fuel, or streamed into other industrial processes. As mentioned above, the distilled light hydrocarbon product is free of any heavy hydrocarbons and constitutes the sole product of the process of an embodiment. Its fractionation proceeds easily and fast, and the energy cost is clearly lower for a one-step refining process than for the multistep refining processes currently used in the industry. Moreover, as mentioned above, the process of an embodiment further comprises recycling of at least a portion of said obtained hydrocarbon product stream to said oil-water separator for dilution purposes.

EXAMPLES

Preparation of the Liquid Mixture of Fatty Acids 1.2 g stearic acid is dissolved in 25 ml ether-aldehyde fraction of ethanol, which is a mixture of ethanol with concentration of 94-98% and 2-6% of ethers, aldehydes, diacetyl, methanol, nitrates and sulphates. The obtained solution is mixed with 50 ml technical grade oleic acid to obtain clear solution of the liquid mixture. The technical grade oleic acid contains the following fatty acids (in w/w %):

| | | |
|---|---|---|
| $C_{14}H_{28}O_2$ | Myristic acid | 0.2-0.5% |
| $C_{16}H_{32}O_2$ | Palmitic acid | 4.0-6.5% |
| $C_{16}H_{30}O_2$ | Palmitoleic acid | 0.2-0.5% |
| $C_{18}H_{36}O_2$ | Stearic acid | 1.0-3.5% |
| $C_{18}H_{34}O_2$ | Oleic acid | 50.0-68.0% |
| $C_{18}H_{32}O_2$ | Linoleic acid | 17.0-20.0% |
| $C_{18}H_{30}O_2$ | Linolenic acid | 1.0-3.0% |
| $C_{20}H_{40}O_2$ | Arachidic acid | 0.3-0.7% |
| $C_{20}H_{38}O_2$ | Gadoleic acid | 1.5-3.5% |
| $C_{22}H_{42}O_2$ | Erucic acid | 4.5-14.0% |

The obtained liquid mixture of the fatty acids can be introduced in any type of the hydrocarbon feedstock including lubricant oils, heavy oil fractions, residues, bitumen or tar. These fractions can be diluted, washed and desalted at the ambient temperature prior to the reaction.

Preparation of the Solid Mixture of Fatty Acids Complexed with Metals

The above prepared liquid mixture of fatty acids is added to the hydrocarbon feedstock to obtain about 0.5-1.0% w/w mixture, followed by the low-temperature cracking reaction until only solid product with a small amount of heavy unevaporated hydrocarbons and other impurities is left in the reaction vessel. This solid product is washed with gasoline and kerosene to remove the heavy unevaporated hydrocarbons and other impurities. The obtained solid product is milled, blended, again washed and activated with the ether-aldehyde fraction of ethanol. The obtained dried product is a solid mixture of fatty acids complexed with metals. It may be introduced directly into the liquid solution subjected to the cracking or placed in the distillation column to contact with the distilled liquid phase.

Preparation of the Hydrocarbon Feedstock for Low-Temperature Process

Hydrocarbon feedstock received at refinery is usually already pre-treated by removing suspended solids and containing less than 0.5% w/w water.

However, lubricant oil wastes, heavy crude oil, oil sludge and mazut require special pre-treatment. Lubricant oil wastes are diluted with the light hydrocarbon product of an embodiment of the present application to obtain a lubricating oil solution having the density in the range of 0.82-0.84 g/cm$^3$. The obtained solution is filtered and left overnight in an oil-water separator to separate oil and aqueous phases. The separated oil also containing less than 0.5% w/w water is transferred from the separator into said reaction vessel.

Heavy crude oil, oil sludge and mazut are mixed to obtain slurry, followed by dilution of said slurry with the light hydrocarbon product of an embodiment to obtain the density of said diluted slurry in the range of 0.82-0.84 g/cm$^3$. The diluted slurry is filtered and left overnight in an oil-water separator, in order to sediment suspended solids and to separate oil and aqueous phases. The separated oil phase containing less than 0.5% w/w water is transferred from the separator into said reaction vessel.

The reason for the above pre-treatment of the hydrocarbon feedstock is actually a removal of water, which must not exceed 0.5% w/w in total in the reaction mixture. The same problem persists with unfiltered solid particles or suspended solids, which should be removed prior to initiating the cracking process.

Low-Temperature Process with the Liquid Mixture of Fatty Acids

In a 250-ml Beaker glass, 100 ml of the hydrocarbon feedstock are added, followed by addition of approximately 0.5-1.0% liquid mixture of fatty acids by volume. This solution is transferred into 250-ml Würtz flask equipped with a Liebig condenser and a thermometer. A graduated cylinder is placed at the end of the Liebig condenser to collect the distilled liquid. The Würtz flask containing the feedstock solution with the fatty acids is gently heated using an oil bath until the first drop of the condensed liquid appears in the graduated cylinder. When the condensed liquid stops dropping into the graduated cylinder, the heating is increased, thereby increasing the boiling temperature of the liquid in the Würtz flask. This cycle is repeated several times. The process is slowed down when the reaction yield of the light hydrocarbon product reaches 78-82%.

When almost all the liquid (93-95%) is distilled from the Würtz flask to a graduated cylinder, the process is stopped. The condensed liquid in the graduated cylinder constitutes the light hydrocarbon product of the cracking reaction. The reaction yield is calculated based on the measured volume of this liquid. The table below shows the yield of the light hydrocarbon product at different boiling temperatures for the 1% fatty acid mixture:

| %  | ° C. |
|----|------|
| 10 | 90   |
| 20 | 170  |
| 30 | 240  |
| 40 | 230  |
| 50 | 275  |
| 60 | 240  |
| 70 | 240  |
| 80 | 245  |
| 86 | 205  |

There was some bubbling in the flask between 40-45° C. with increasing the volume of the reaction mixture for 10-15%, but the actual boiling started at 55° C. The cracking process was stable and homogeneous between 48-77% of the distilled liquid and did not require any temperature regulation. The heating temperature was increased at 23%, 48% and 77% of the distilled liquid.

Low-Temperature Process with the Solid Mixture of Fatty Acids Complexed with Metals In a 250-ml Beaker glass, 100 ml of the hydrocarbon feedstock are added, followed by addition of 2-3 g of the solid mixture of fatty acids complexed with metals. Then the same procedure as for the liquid mixture of the fatty acids described above is followed, and the results obtained are the same.

Laboratory Experiments—Distillation with the Addition of a Reactant-Catalyst

The results of the tests performed in the accredited testing laboratory "West-Inos" (Lvov, Ukraine) are presented below. Conditions of the different tests met the requirements of normative documents for testing and related laboratory equipment. Distillation of the submitted oil samples was carried out according to GOST 11011-85.

Density of the sample crude oil at temperature 20° C. (GOST 3900) was measured to be 856.2 kg/m$^3$, while density of the same crude oil at temperature 15° C. (GOST 31072) was measured to be 859.5 kg/m$^3$.

Weight of the crude oil sample was 2800 g. The amount of the reactant-catalyst introduced into the distillation cube was 33 ml (1% per crude oil volume). The reactant-catalyst and crude oil were not stirred. The results of the crude oil distillation with the reactant-catalyst are given in Table 1.

TABLE 1

| Batch | Weight of the selected fraction, g | Temperature ° C., Cube | Temperature ° C., Vapours | % Weight per crude oil | Fraction |
|-------|------------------------------------|------------------------|---------------------------|------------------------|----------|
| 1 | 35.4* | Up to 250 | Up to 190 | 18.34 | Gasoline |
| 2 | 270.5 | | | | |
| 3 | 207.5 | | | | |
| 4 | 346.5 | 250-303 | 190-250 | 12.38 (30.72) | Sample 1 (kerosene) |
| 5 | 435.5 | 303-343 | 250-285 | 15.56 (46.28) | Sample 2 (diesel) |
| 6 | 506.0 | 345-363 | 285-305 | 18.07 (64.35) | Sample 3 (diesel) |
| 7 | 652.0 | 365-367 | 305-313 | 23.29 (87.64) | Sample 4 (diesel) |
| 8 | 34.2** | 367 | | 1.22 (88.86) | |
| Σ | 2487.6 | | | | |

*Fraction with a boiling point up to 48° C., included in the total yield of light fractions, but excluded from further testing.
**Fraction in the beginning of thermal decomposition, included in the total yield of light fractions, but excluded from the composition of the tested diesel fuel.

As seen in Table 1, the total yield of the light fractions was 88.86% and included the following light hydrocarbon products: gasoline (petrol)—18.34% by weight, kerosene—12.38% by weight, and diesel oil—58.14% by weight. The residue in the distillation cube was 230 g (8.21% by weight) and the weight loss was only 82 g (2.93% by weight).

After the distillation, one sample of gasoline, one sample of kerosene fractions and three samples of diesel fuel were obtained, for which the octane number (gasoline, kerosene) and cetane number (diesel fuel) were determined. The results are shown in Table 2.

TABLE 2

| | Physico-chemical parameter | Actual value | Control method |
|---|---|---|---|
| Cetane number | Sample 1 (kerosene) | 52.0 | Express method |
| | Sample 2 (diesel fuel) | 46.6 | |
| | Sample 3 (diesel fuel) | 42.7 | |
| | Sample 4 (diesel fuel) | 41.7 | |
| Detonation resistance (gasoline) | Research octane number (RON) | 93.9 | Express method |
| | Motor octane number (MON) | 85.4 | |

Further, samples 2-4 (diesel fuel) were combined into one. This combined sample was further distilled to obtain two fractions: light diesel fuel fraction with the boiling point up to 300° C. (vapour temperature), further purification on silica gel, and heavy diesel fuel fraction with the boiling point higher than 300° C. (vapour temperature). These two fractions were sent to the testing. Purification on a silica gel of a sample of gasoline and kerosene was carried out in the "West-Inos" laboratory, as well.

Four samples were obtained: gasoline, kerosene, diesel fuel and oils. The results of their testing are given in Tables 3, 4, 5 and 6 below.

TABLE 3

Gasoline (petrol)

| Batch | Physico-chemical parameter | Actual value | |
|---|---|---|---|
| 1 | Density at temperature 15° C., kg/m³ | 749.2 | GOST 31072 |
| 2 | Fraction composition: | | GOST 2177 |
| | The beginning of boiling, ° C. | 63 | (Method A) |
| | 5% distilled away at temperature, ° C. | 89 | |
| | 10% distilled away at temperature, ° C. | 97 | |
| | 20% distilled away at temperature, ° C. | 106 | |
| | 30% distilled away at temperature, ° C. | 114 | |
| | 40% distilled away at temperature, ° C. | 122 | |
| | 50% distilled away at temperature, ° C. | 131 | |
| | 60% distilled away at temperature, ° C. | 140 | |
| | 70% distilled away at temperature, ° C. | 149 | |
| | 80% distilled away at temperature, ° C. | 159 | |
| | 90% distilled away at temperature, ° C. | 170 | |
| | 95% distilled away at temperature, ° C. | 179 | |
| | Up to 70° C. distilled away, % | 1.0 | |
| | Up to 100° C. distilled away, % | 13.0 | |
| | Up to 150° C. distilled away, % | 71.0 | |
| | End of boiling, ° C. | 196 | |
| | Residue in the flask, % | 1.0 | |
| 3 | Detonation resistance: | | Express method |
| | Research octane number (RON) | 93.8 | |
| | Motor octane number (MON) | 85.3 | |
| 4 | Sulphur content, weight % | 0.0158 | GSTU ISO 20847 |
| 5 | Appearance: Transparent and light, light-yelow shade, without suspended solids and water | | GSTU 7687 par. 9.4 |
| 6 | Volume fraction of aromatic hydrocarbons, % | 10.51 | GOST 29040 |
| 7 | Volume fraction of benzene, % | 0.56 | GSTU EN 12177 |
| 8 | Weight fraction of oxygen, % | 0.5 | GSTU EN 13132 |
| 9 | Volume fraction of oxygen-containing compounds, %: | | GSTU EN 13132 |
| | methanol | <0.17 | |
| | ethanol fuel | 0.2 | |
| | isopropanol | 1.26 | |
| | isobutanol | 0 | |
| | t-butanol | 0 | |
| | esters ($C_5$ and higher) | 0.1 | |
| | other oxygen-containing compounds with a boiling point not higher than 210° C. | <0.17 | |

TABLE 5

Kerosene

| Batch | Physico-chemical parameter | Actual value | |
|---|---|---|---|
| 1 | Detonation resistance: | | Express method |
| | Research octane number (RON) | 94.0 | |
| | Motor octane number (MON) | 85.3 | |

TABLE 6

Diesel fuel

| Batch | Physico-chemical parameter | Actual value | |
|---|---|---|---|
| 1 | Density at temperature 15° C., kg/m³ | 826.0 | GOST 31072 |
| 2 | Fraction composition: | | GOST 2177 |
| | The beginning of boiling, ° C. | 106 | (Method A) |
| | 5% distilled away at temperature, ° C. | 156 | |
| | 10% distilled away at temperature, ° C. | 194 | |
| | 20% distilled away at temperature, ° C. | 236 | |
| | 30% distilled away at temperature, ° C. | 260 | |
| | 40% distilled away at temperature, ° C. | 275 | |
| | 50% distilled away at temperature, ° C. | 286 | |
| | 60% distilled away at temperature, ° C. | 298 | |
| | 70% distilled away at temperature, ° C. | 308 | |
| | 80% distilled away at temperature, ° C. | 318 | |
| | 90% distilled away at temperature, ° C. | 344 | |
| | Up to 250° C. distilled away, % | 26.0 | |
| | Up to 350° C. distilled away, % | 91.0 | |
| | 95% distilled away at temperature, ° C. | 360 | |
| | End of boiling, ° C. | 367 | |
| | Residue in the flask, % | 2.0 | |
| 3 | Flash point in a closed cup, ° C. | 30 | GOST 6356 |
| 4 | Kinematic viscosity at 40° C., mm²/sec | 2.69 | GOST 33 |
| 5 | Cold filter plugging point, ° C. | 2 | GSTU EN 116 |
| 6 | Ash content, weight % | 0.01 | GOST 1461 |
| 7 | Cetane number | 47.7 | Express method |
| 8 | Sulphur content, weight % | 0.517 | GSTU ISO 20847 |

TABLE 7

Oil

| Batch | Physico-chemical parameter | Actual value | |
|---|---|---|---|
| 1 | Kinematic viscosity at 40° C., mm²/sec | 8.95 | GOST 33 |
| 2 | Kinematic viscosity at 100° C., mm²/sec | 2.69 | GOST 33 |
| 3 | Pour point, ° C. | 20 | GOST 20287 |
| 4 | Flash point in an open cup, ° C. | 132 | GOST 4333 |
| 5 | Sulphur content, weight % | 0.625 | GSTU ISO 20847 |

The following Table 8 shows the results for the distillation of the light naphtha fraction with respect to hexane and heptane. The experiment was performed as follows. In 120 ml of n-hexane, 1 ml of the reactant-catalyst was added, and the mixture was heated and distilled in a Würtz flask. 110 ml of the distillate sample "G" were obtained.

In a separate experiment, 120 ml of n-hexane and 1 ml of the reactant-catalyst were added to the pre-treated oil sludge. The pre-treatment included suspended solid and water removal (see the above protocol for the pre-treatment of oil sludge). In addition, light hydrocarbons (boiling point lower than 125° C.) were removed. The pre-treated oil sludge was distilled in a Würtz flask. The obtained distillate sample is designated in Table 8 as "G.Sys."

In the third experiment, 120 ml of n-heptane and 1 ml of the reactant-catalyst were added to the oil sludge, pre-treated as above and then distilled in a Würtz flask. The obtained distillate sample is designated in Table 8 as "H".

TABLE 8

| | | Detonation resistance | Actual value | Control method |
|---|---|---|---|---|
| Hexane | G | Research octane number (RON) | 75.0 | Express method |
| | | Motor octane number (MON) | 74.8 | |
| | G. Sys. | Research octane number (RON) | 79.3 | |
| | | Motor octane number (MON) | 77.8 | |
| Heptane | H | Research octane number (RON) | 85.1 | |
| | | Motor octane number (MON) | 81.5 | |

The following Table 9 summarises all the above results:

TABLE 9

| | | RON | MON | Cetane Number |
|---|---|---|---|---|
| 1 | Gasoline: | | | |
| | distillation without the reactant-catalyst | 41-56 | 43-58 | — |
| | distillation with the reactant-catalyst | 93.9 | 85.4 | — |
| 2 | Kerosene: | | | |
| | distillation without the reactant-catalyst | 30 | — | 40 |
| | distillation with the reactant-catalyst | 94 | 85.3 | 52 |
| 3 | Diesel fuel: | | | |
| | distillation without the reactant-catalyst | — | — | 45-55 |
| | distillation with the reactant-catalyst | — | — | 47.7 |
| 4 | n-Hexane: | | | |
| | distillation without the reactant-catalyst | 24-26 | — | — |
| | distillation with the reactant-catalyst | 79.3 | 77.8 | — |
| 5 | n-Heptane: | | | |
| | distillation without the reactant-catalyst | 0 | — | — |
| | distillation with the reactant-catalyst | 85.1 | 81.5 | — |

While certain features of the present application have been illustrated and described herein, many modifications, substitutions, changes, and equivalents will be apparent to those of ordinary skill in the art. It is, therefore, to be understood that the appended claims are intended to cover all such modifications and changes as fall within the true spirit of the present application.

The invention claimed is:

1. A one-step combined process for preparing a light hydrocarbon product from a non-fractionated or fractionated hydrocarbon feedstock, wherein said process combines refining, isomerisation and cracking of said non-fractionated or fractionated hydrocarbon feedstock in one step, characterised in that:
    (a) said one step comprises heating said hydrocarbon feedstock in a reaction vessel with a reactant-catalyst at a vapour temperature below 360° C. to obtain said light hydrocarbon product,
    (b) said light hydrocarbon product is obtained in said process with a total yield of at least 60% and contains no heavy hydrocarbon products,
    (c) said process is accompanied by formation of aromatic hydrocarbons,
    (d) said reactant-catalyst is either a liquid mixture of stearic acid dissolved in ether-aldehyde fraction of ethanol and mixed with technical grade oleic acid, or a solid residue which remains in the reaction vessel after completion of said process, said solid residue activated with the ether-aldehyde fraction of ethanol, wherein said ether-aldehyde fraction of ethanol contains 94-98% of ethanol and 2-6% of ethers, aldehydes, acetone, diacetyl, methanol, nitrates and sulphates.

2. The process of claim 1, wherein said hydrocarbon feedstock is selected from natural gas condensate, crude oil (petroleum), atmospheric or vacuum residues of refinery feedstocks, solvent deasphalted oils derived from said crude oil and said atmospheric or vacuum residues of refinery feedstocks, shale oil, oil sands, waste lubricating oils, oil sludge and other oil wastes, or mixtures thereof.

3. The process of claim 1, wherein said light hydrocarbon product contains light petroleum gases, naphtha, gasoline (petrol) for motor and turbine fuels, kerosene, diesel fuel (fuel oil) and light crude oil.

4. The process of claim 1, wherein said heavy hydrocarbon products, which are not obtained in said process, are the hydrocarbons containing 25 carbon atoms or more.

5. The process of claim 1, wherein said hydrocarbon feedstock is continuously fed into the reaction vessel together with said reactant-catalyst.

6. The process of claim 1, wherein said obtained light hydrocarbon products are continuously distilled from the reaction vessel and further collected in a product storage tank.

7. The process of claim 1, wherein said obtained light hydrocarbon products are fractionally distilled from the reaction vessel, and further collected in a product storage tank.

8. The process of claim 1, wherein said hydrocarbon feedstock is pre-treated prior to feeding it into the reaction vessel to remove water, water-soluble salts and suspended solids from said hydrocarbon feedstock.

9. The process of claim 8, wherein said hydrocarbon feedstock is initially streamed into an oil-water separator for separating gross amounts of oils from a wastewater and suspended solids found in the wastewater effluents of refineries and various plants or in the waste lubricating oils, oil sludge and other oil wastes.

10. The process of claim 1, wherein said hydrocarbon feedstock is diluted before the said process with a portion of the light hydrocarbon product for obtaining the hydrocarbon feedstock having the density lower than 0.82-0.84 g/cm$^3$.

11. The process of claim 10, wherein said dilution is carried out continuously during said process or during transportation of the hydrocarbon feedstock.

12. The process of claim 10, wherein said portion of the light hydrocarbon product used for dilution of the hydrocarbon feedstock is taken from a light naphtha fraction having boiling range between 40° C. to 105° C.

13. The process of claim 1, wherein said heating of said hydrocarbon feedstock in the reaction vessel is carried out under atmospheric pressure.

14. The process of claim 1, wherein said heating of said hydrocarbon feedstock in the reaction vessel is carried out under elevated pressure or in vacuum.

15. The process of claim 1, wherein said process is continuous or semi-continuous.

16. The process of claim 1, wherein the total yield of the light hydrocarbon product is at least 80%.

17. The process of claim 1, wherein said reactant catalyst is capable of forming in-situ a complex with metals or metal ions inherently present in said non-fractionated or fractionated hydrocarbon feedstock, thereby catalysing said process.

* * * * *